Figure 1:
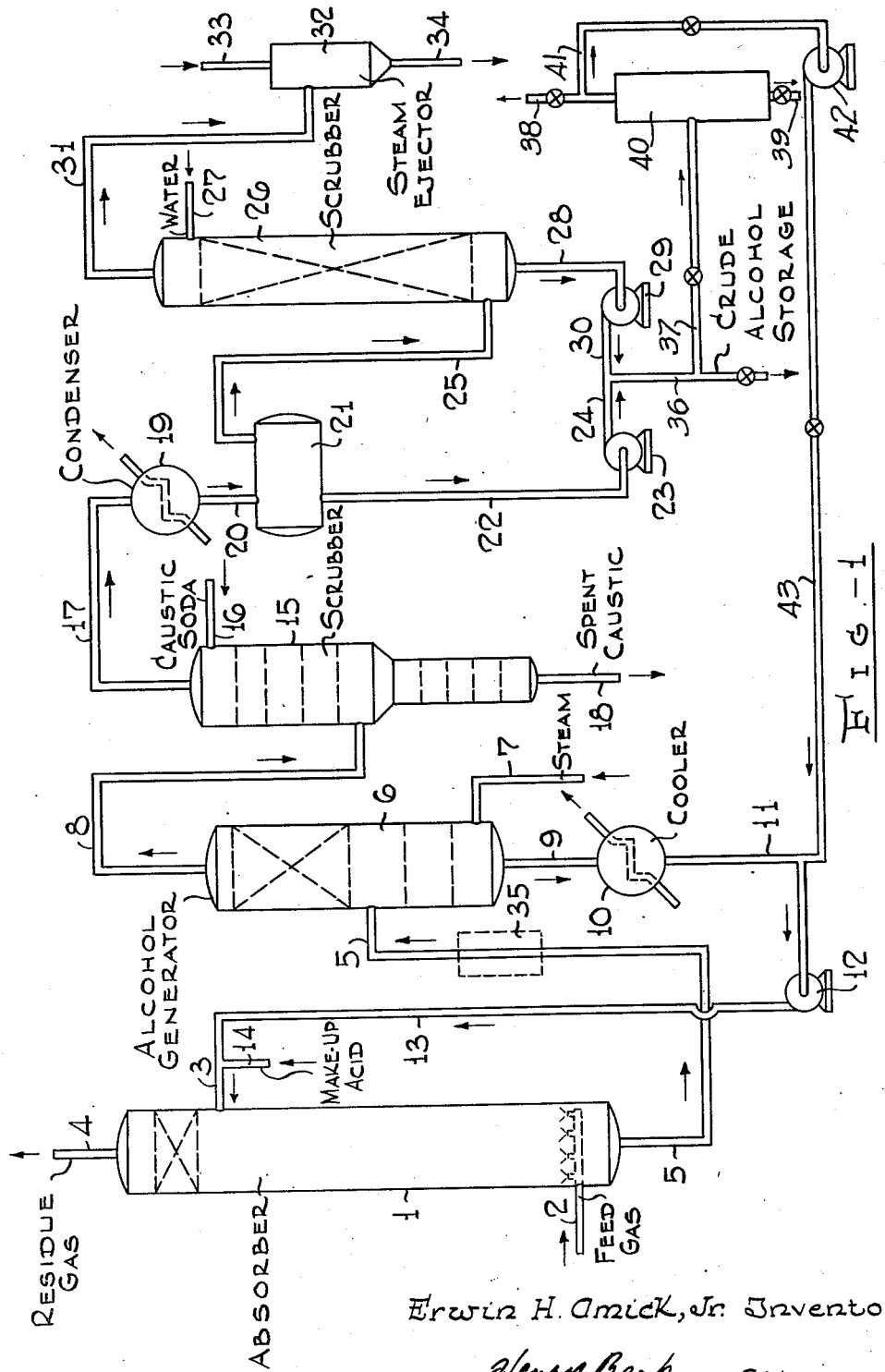

Sept. 2, 1952      E. H. AMICK, JR      2,609,400
MODIFIED WEAK-ACID ISOPROPANOL PROCESS
Filed April 5, 1950      3 Sheets-Sheet 1

Erwin H. Amick, Jr. Inventor
By Henry Berk Attorney

Patented Sept. 2, 1952

2,609,400

UNITED STATES PATENT OFFICE 2,609,400

MODIFIED WEAK-ACID ISOPROPANOL PROCESS

Erwin H. Amick, Jr., Linden, N. J., assignor to Standard Oil Development Company, a corporation of Delaware Application April 5, 1950, Serial No. 154,127

15 Claims. (Cl. 260—639)

This invention relates to a process for producing isopropanol by the indirect hydration of propylene. More specifically the invention relates to a modified weak-acid isopropanol process.

The weak-acid isopropanol process comprises the following essential phases:

1. Absorption of propylene in approximately 70% sulfuric acid at about 170° F. and approximately 250 lbs. per sq. in. gauge pressure to form a mixture which probably consists of isopropyl sulfates, isopropyl alcohol, isopropyl ether, and traces of polymer. The concentration of propylene in the feed stream is a factor which is correlated with the pressure employed in the absorber; for example, with concentrated propylene (75–85 mol percent) a simplified absorber design is used and absorption can be carried out at comparatively low pressure, for example, 200–250 p. s. i. g. On the other hand, a more dilute propylene feed (50–55 mol percent) requires a higher absorber pressure and possibly the use of an absorption system with several contact stages for high propylene recovery.

2. Additional hydrolysis by dilution of the extract leaving the absorber to approximately 45% sulfuric acid (on the hydrocarbon free basis) and maintaining the extract at about 190° F. for a period of about 10 minutes residence time.

3. Distillation of the hydrolysis products (alcohol and ether) from the spent acid in a generator-stripping zone and reconcentration of the spent acid from about 45% to 70% strength.

In the weak-acid process the generator-stripping zone is operated so as to remove as substantially completely as possible all organic material from the hydrolyzed extract. This is accomplished by previously diluting the extract with water from an acid concentration of about 70 weight percent on an organic free basis to about 45 weight percent on the same basis, and supplying sufficient heat to the generator-stripping zone to remove substantially all the propylene from the dilute acid in the form of isopropyl alcohol, isopropyl ether and propylene, but particularly in the form of the alcohol. The dilute spent acid is subjected to reconcentration in reboiler equipment such as the well-known Simonsen-Mantius concentrators and the steam generated therein is employed in the generator-stripping zone to effect the stripping. Reconcentration of the spent acid is a costly procedure and is often hampered by the fact that the concentrators become fouled by the presence therein of sludges and tars resulting from the continuous application of heat upon organic material not completely removed from the acid extract in the generator-stripping zone.

It is an object of this invention to produce isopropanol in an indirect hydration process employing weak sulfuric acid in which reconcentration of the sulfuric acid is avoided.

This and other objects of the invention are accomplished by forming an acid extract by absorbing propylene or its equivalent, e. g., isopropyl alcohol or isopropyl ether, in sulfuric acid of 60–70 weight percent, preferably about 65–68 weight percent to a saturation of 0.60 to 1.50, preferably 0.90 to 1.30 moles of propylene per mole of sulfuric acid and thereafter stripping said extract, without dilution with water, in a generator-stripping zone under pressure below atmospheric pressure, or by stripping with a propylene-containing gas or inert gas such as $N_2$, $CO_2$, etc. at atmospheric or subatmospheric pressure. Instead of removing all organic material as completely as possible from the extract in the generator-stripping zone, only a small amount, 3–20 weight percent, preferably about 5–10 weight percent, of the propylene is removed from the extract during the stripping in the form of isopropanol, and isopropyl ether and some regenerated propylene in minor amount. Only sufficient water is added to the partially stripped acid extract, preferably in the form of steam to the generator-stripper, to replace that water consumed in hydrating the small amount of propylene removed from the generator in the form of isopropanol and isopropyl ether.

It is necessary to carefully adjust the heat balance of the generator so that dilution of the acid does not occur. This heat balance can be maintained by (1) regulation of temperature of extract, (2) control of steam temperature and pressure, or (3) use of a hot stripping gas.

Acid extract of reduced saturation, but still containing 60–70 weight percent sulfuric acid is withdrawn from the base of the generator and returned to the upper section of the absorber for further absorption of propylene to increase its strength to the original saturation. The cycle is then repeated. Vapors from the stripping zone are processed in the usual way. They are first caustic-scrubbed with dilute aqueous caustic for removal of entrained acid vapors, condensed to knock out the crude isopropanol, and the uncondensed vapors are further water-scrubbed for removal of remaining traces of alcohol therefrom.

Any propylene or hydrocarbon vapors remaining uncondensed pass through the water scrubber and are either burned, returned with the feed gas to the absorber, or employed as stripping gas in the recovery of isopropanol from the generator-stripper.

The invention will be more fully understood from the following description of the invention in conjunction with the accompanying Figure 1 which is a diagrammatic cross-sectional view of typical equipment employed in the process.

Referring to Figure 1 propylene-rich gas or liquid which is substantially free of $C_4$-unsaturates, particularly butadiene, is introduced through line 2 into absorber 1 by means of jets to obtain dispersion of the propylene through the reaction mixture. Recycled sulfuric acid-propylene extract of approximately 60–70 weight percent acid strength previously prepared by absorbing propylene in 60–70 weight percent sulfuric acid to a saturation of 0.60 to 1.50 and stripped in generator 6 is withdrawn from generator 6 via line 11 and continuously pumped by means of pump 12 through lines 13 and 3 into the absorber at a point or plurality of points near the top thereof. The absorber is operated at a temperature in the range of 140° F. to 190° F. and a suitable pressure in the range of 100 to 500 p. s. i. g., preferably about 250 p. s. i. g. depending on the concentration of propylene in the feed stream. In the absorber the propylene reacts with the acid in the propylene extract to form a more saturated extract product containing from 0.6 to 1.5 moles of propylene per mole of sulfuric acid, preferably about 0.9 to 1.3 moles of propylene per mole of acid. In no case should the acid strength of the extract fall below 60% on a hydrocarbon free basis, nor should it be allowed to exceed 70%. The extract product is gravitated continuously to the bottom of the tower and is removed therefrom via line 5 to the alcohol generator 6 without dilution with water. Unadsorbed gases lean in propylene leave the tower via line 4.

The absorption reaction is exothermic to the extent of approximately 25,000 B. t. u. per mole of propylene absorbed, and this heat is removed, if necessary, by cooling the extract by means of a cooler 10 inserted in line 11. Circulation of the extract from the bottom of the absorber through a cooling zone and thence back to the top of the absorber is avoided.

Heat exchanger 35 acts as a heater or cooler depending upon heat losses, etc. in the generator, and is employed to maintain the necessary heat balance. The amount of hydrocarbon in the form of propylene or its hydration products removed from the extract in the generator is purposely limited so that a larger quantity of material is recycled through cooler 10 to bring down the temperature so that the temperature of the absorption is maintained constant.

The acid extract leaving the bottom of tower 1 via line 5 is a mixture of isopropyl alcohol, isopropyl sulfate, isopropyl ether and free sulfuric acid. This extract is preferably of about 0.9 to 1.3 saturation, i. e. it contains 0.9 to 1.3 moles of propylene per mole of sulfuric acid. The extract has an acid strength of 60–70 weight percent on a hydrocarbon free basis, preferably about 65–68 weight percent.

Alcohol generator 6 is the usual type of stripping column except that in this process it is of reduced size due to the nature of the stripping occurring therein. The number of trays or plates is considerably less than that required in the conventional process where complete stripping is attempted. In one modification of this invention the generator is operated under a pressure below atmospheric maintained by means of steam ejector 32. A suitable conventional reciprocating vacuum pump may be substituted for the steam ejector. The subatmospheric pressure maintained in the generator 6 minimizes the regeneration of propylene from the extract being stripped. The actual pressure employed is a function, among other factors, of the acid concentration of the extract undergoing stripping but lies generally in the range of 200–750 mm. For example, at 61.5 weight percent acid in the extract the generator may be operated at a pressure slightly below atmospheric pressure, e. g. 740–750 mm. Hg. At 70 weight percent acid lower pressures such as 270–280 mm. Hg are required to minimize propylene regeneration. The preferred range of operation is at 400–600 mm. Hg with a 65–66 weight percent acid extract.

In a second modification of this invention the stripping occurs with the aid of an inert gas such as $N_2$, $CO_2$, etc. or with a propylene-containing gas such as propylene itself or the propylene feed gas or the propylene-containing gases recovered from the water scrubber via line 31 and 34. In the employment of the latter gases they are recycled via line 34 to the generator 6, entering through line 7. When these inert or propylene-containing gases are employed the stripping need not be done under the vacuum required in their absence, but higher pressures up to and including atmospheric pressure may be employed. When the invention is carried out according to this second modification the use of propylene or a propylene-containing gas is preferred inasmuch as this has a tendency to minimize propylene regeneration from the extract. When employing these gases as stripping agents it is preferred to maintain partial pressures of isopropanol, isopropyl ether and water in the range of subatmospheric pressure. The amount of stripping gas and total pressure are so regulated in order that these partial pressures will obtain. The sum of the partial pressures of isopropanol, isopropyl ether and water therefore will lie in the range of 200–750 mm., preferably 400–600 mm.

In further departure from the prior art practices, there is removed (in the form of isopropanol and isopropyl ether) from the generator by stripping only a small amount, say 3–20%, preferably 5–10%, of the propylene contained in the acid extract entering the generator. To this extent therefore the acid extract is not diluted with water before entering the generator, and in the stripping operation only sufficient steam is added to the generator via line 7 to replace that water required to hydrate the propylene so removed in the form of alcohol and/or ether. Vapors of the latter containing some regenerated propylene are removed from the generator via line 8 for further processing as will be described below.

Hot acid extract of reduced saturation (i. e. reduced in saturation by 5–10% due to removal of that amount of propylene in the form of alcohol or ether) is removed as bottoms from generator 6 via line 9, cooled in cooler 10, led by pipe 11 to pump 12, and returned via lines 13 and 3 to the upper section of the absorber 1 for further reaction with the feed gas. Make-up acid if needed is added to the extract via line 14.

Overhead vapors from the generator, consisting of isopropyl alcohol of approximately 55–75 weight percent strength, isopropyl ether, and propylene enter a caustic scrubber 15 at a point near the mid-section thereof. The vapors are countercurrently scrubbed with dilute aqueous caustic solution (2-10%) entering the top of the scrubber via line 16. The caustic solution removes entrained acid from the crude alcohol vapors. Spent caustic is removed from the scrubbing tower via line 18. It may be steam stripped to remove any alcohol content thereof if necessary.

Acid-free vapors from the scrubber 15 are removed overhead via line 17, condensed in condenser 19 and led via line 20 to condensate drum 21. The condensate consisting of crude isopropanol, and containing isopropyl ether as the chief impurity, is removed from the condensate drum via line 22 and pumped by pump 23 through pipe 24 to storage (not shown). Uncondensed gases containing propylene and some alcohol and ether vapors are vented from the condensate drum by pipe 25. These vapors are introduced into the bottom of water scrubber 26 wherein they pass upwardly in countercurrent flow to descending water introduced through line 27. Only sufficient water is fed to the scrubber to wash the major portion of any alcohol and ether vapors from the gas. The recovered alcohol and ether in aqueous solution flow via line 28 to be pumped through pipe 30 by pump 29 where they are mixed with the condensate in pipe 24 and sent via pipe 36 to storage. Overhead vapors consisting substantially of propylene pass through the steam ejector 32 fed by steam line 33 and are removed from the system via line 34. These gases may be burned or recycled to the absorption zone according to existing economic dictates.

It is also a feature of this invention to strip isopropyl ether from the crude alcohol and return the ether to the absorption zone to repress ether formation therein, thus allowing a greater overall alcohol/ether production ratio. In this aspect of the invention crude alcohol is withdrawn via pipe 37 to distillation vessel 40. Ether is distilled overhead via line 38 while the ether-free alcohol is recovered as bottoms via line 39. Part of the ether is removed via line 41 and with the assistance of pump 42 is pumped via line 43 into the stream of acid extract on its way back to the absorber 1.

The invention is illustrated by the following working example:

Propylene is countercurrently absorbed in sulfuric acid in an absorber until an extract containing a propylene:sulfuric acid ratio of 1.2 is established, the extract containing about 60.0 weight per cent $H_2SO_4$. The extract is conducted to a stripping zone where it is subjected to flash vaporization at a pressure of 200 mm. absolute, such that 5-10% of the solution was vaporized. During the vaporization the acid concentration of the extract in the still increased to about 63 weight percent, while the propylene:sulfuric acid ratio fell to about 0.950. The condensed distillate recovered from the vaporization contained approximately 75 weight percent isopropanol, 2-3% isopropyl ether and the balance water. Small amounts of propylene (about 5% of the total propylene evolved as alcohol ether and propylene) were also recovered.

The distillate was concentrated to a composition approaching that of the usual 91.3 volume percent azeotrope in the manner well known in the isopropanol refining art. The 63 weight percent acid extract was withdrawn from the bottom of the vaporization zone and returned to the top of the absorber where it absorbed additional propylene to restore its saturation to the mol ratio of about 1.2. Water was added to the solution to bring its acid concentration back to 60 weight percent and the cycle repeated.

It has been further found from experiment that yields of isopropanol can be obtained from 61.5 weight percent acid extract by stripping at about 200 mm. pressure which are practically equivalent to those realized from 46.0 weight percent acid at atmospheric pressure stripping, the latter dilution and distillation representing that commonly used commercially at the present time.

Figure 2:
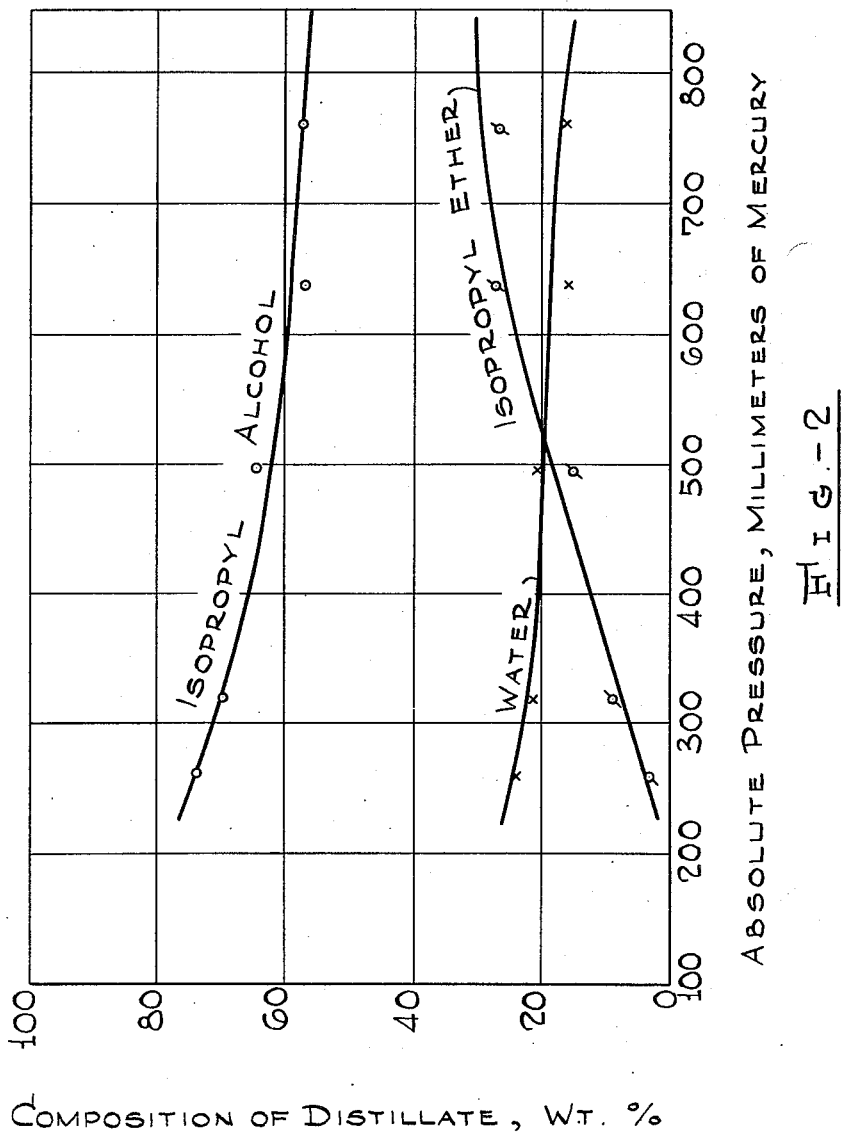
Figure 3:
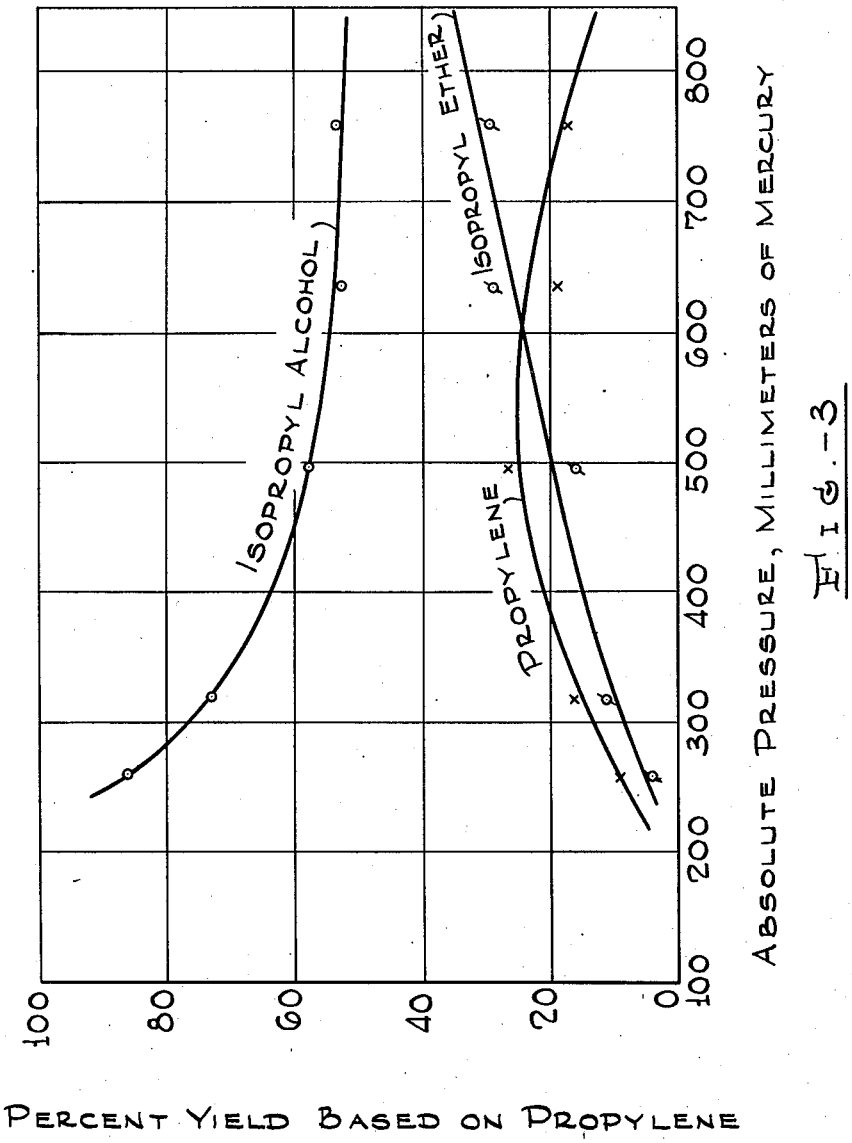

Figure 2 shows the composition of the distillate vs. absolute pressure in the stripping zone for the distillation of a 61.5 weight percent $H_2SO_4$ extract having a mol saturation of 1.06. Figure 3 shows the composition of the total overhead from the stripping zone including propylene. These figures show that by sufficiently reducing the pressure on the stripping zone one obtains yields of alcohol and ether from this extract which are comparable to those obtained by stripping a much more dilute extract of approximately the same saturation (about 45 weight percent) at atmospheric pressure. The latter which typifies present day commercial operation is summarized in the following table:

*Table I*

Composition of distillate and yields of products based on propylene for 46.0% acid, $x$ equals 1.05, distilled at atmospheric pressure.

Weight percent composition of distillate:
i-PrOH _____ 77.9
$H_2O$ _____ 20.1
i-$Pr_2O$ _____ 2.0

Percent yield based on propylene:
i-PrOH _____ 95.0
i-$Pr_2O$ _____ 2.9
Pr= _____ 2.1

It has also been determined that acid extracts of approximately 70 weight percent $H_2SO_4$ represent the upper limit of acid strength of extracts to be subjected to vacuum stripping according to this invention. Thus, when a propylene:sulfuric acid extract of 1.06 saturation containing 69.5 weight percent $H_2SO_4$ was subjected to steam stripping at 271 mm. pressure excessive regeneration of propylene resulted. Although the yields of distillate could be improved by lowering the pressure (i. e. below 271 mm.) it appeared unlikely that yields comparable to those secured from lower acid concentrations at industrially practical vacuum could be obtained.

Having described the invention such that it may be practiced by one skilled in the art, what is claimed is:

1. A process for the production of isopropanol by indirect hydration of propylene which comprises absorbing a fluid comprising propylene in sulfuric acid of 60-70 weight percent concentration in an absorption zone, removing an acid extract having a saturation of 0.6 to 1.5 mols of propylene per mole of sulfuric acid from the absorption zone, passing said extract without dilution with water to a stripping zone, removing a hydration product distillate from the stripping zone comprising 3-20% of the propylene in the acid extract in said stripping zone, recovering isopropanol from the distillate, removing an acid extract of decreased saturation and increased acid strength from the stripping zone, diluting the acid extract with water to restore the acid strength thereof to 60-70 weight percent and returning the diluted extract to the absorption zone.

2. A process for the production of isopropanol by indirect hydration of propylene which comprises absorbing a fluid comprising propylene in sulfuric acid of 60-70 weight percent concentration in an absorption zone, removing an acid extract having a saturation of 0.6 to 1.5 mols of propylene per mole of sulfuric acid from the absorption zone, passing said withdrawn extract without dilution with water to a stripping zone, introducing an inert stripping gas into the stripping zone, removing a hydration product distillate from the stripping zone, comprising 3-20% of the propylene in the acid extract in said stripping zone, recovering isopropanol from the distillate, removing an acid extract of decreased saturation and increased acid strength from the stripping zone, diluting the acid extract with water to restore the acid strength thereof to 60-70 weight percent and returning the diluted extract to the absorption zone.

3. A process according to claim 2 in which the acid extract is diluted with water in the form of steam introduced to the generator with the stripping gas.

4. A process for the production of isopropanol by indirect hydration of propylene which comprises absorbing a fluid comprising propylene in sulfuric acid of 60-70 weight percent concentration in an absorption zone, removing an acid extract having a saturation of 0.6 to 1.5 moles of propylene per mole of sulfuric acid from the absorption zone, passing said withdrawn extract without dilution with water to a flash stripping zone operated at a pressure below atmospheric pressure, removing a hydration product distillate from the stripping zone comprising 3-20% of the propylene in the acid extract in said stripping zone, recovering isopropanol from the distillate, removing an acid extract of decreased saturation and increased acid strength from the stripping zone, diluting the acid extract with water to restore the acid strength thereof to 60-70 weight percent and returning the diluted extract to the absorption zone.

5. A process according to claim 4 in which the acid extract is diluted with water in the form of steam added to the stripping zone.

6. A process for the production of isopropanol by indirect hydration of propylene which comprises absorbing a fluid comprising propylene in sulfuric acid of 65-80 weight percent concentration in an absorption zone, removing an acid extract having a saturation of 0.9 to 1.3 moles of propylene per mole of sulfuric acid from the absorption zone, passing said withdrawn extract without dilution with water to a flash stripping zone operated at a pressure below atmospheric pressure, removing a hydration product distillate from the stripping zone comprising 5-10% of the propylene in the acid extract in said stripping zone, recovering isopropanol from the distillate, removing an acid extract of decreased saturation and increased acid strength from the stripping zone, diluting the acid extract with water to restore the acid strength thereof to 65-68 weight percent and returning the diluted extract to the absorption zone.

7. A process according to claim 4 in which the pressure in the stripping zone is 200-600 mm. absolute.

8. A process for producing isopropanol by indirect hydration of propylene which comprises absorbing a fluid comprising propylene in a sulfuric acid extract containing 60-70 weight percent acid in an absorption zone, removing an acid extract having a saturation of 0.6 to 1.5 moles of propylene per mole of sulfuric acid from the absorption zone, passing said withdrawn extract without dilution with water to a flash stripping zone operated at a pressure below atmospheric pressure, removing a hydration product distillate from the stripping zone comprising 3-20% of the propylene in the acid extract in said stripping zone, recovering isopropanol from the distillate, removing an acid extract of decreased saturation and increased acid strength from the stripping zone, diluting the acid extract with water to restore the acid strength thereof to 60-70 weight percent, and returning the diluted extract to the absorption zone.

9. A process for producing isopropanol by indirect hydration of propylene which comprises absorbing a fluid comprising propylene in a sulfuric acid extract containing 65-68 weight percent acid in the absorption zone, removing an acid extract having a saturation of 0.9 to 1.3 moles of propylene per mole of sulfuric acid from the absorption zone, passing said withdrawn extract without dilution with water to a flash stripping zone operated at a pressure below atmospheric pressure, removing a hydration product distillate from the stripping zone comprising 5-10% of the propylene in the acid extract in said stripping zone, recovering isopropanol from the distillate, removing an acid extract of decreased saturation and increased acid strength from the stripping zone, diluting the acid extract with water to restore the acid strength thereof to 65-68 weight percent, and returning the diluted extract to the absorption zone.

10. A process according to claim 9 in which the pressure in the stripping zone is 200-600 mm. absolute.

11. A process for producing isopropanol by indirect hydration of propylene which comprises absorbing a fluid comprising propylene in a sulfuric acid extract containing 60-70 weight percent acid in an absorption zone, removing an acid extract containing 0.6 to 1.5 moles of propylene per mole of sulfuric acid from the absorption zone, passing said withdrawn extract without dilution with water to a flash stripping zone operated at a pressure below atmospheric pressure, removing a hydration product distillate from the stripping zone comprising 3-20% of the propylene in the acid extract in said stripping zone, adding sufficient water in the form of steam to the stripping zone to compensate only for that water consumed in forming the hydration product removed from the stripping zone, recovering isopropanol from the distillate, removing an acid extract of decreased saturation but still containing 60-70 weight percent acid from the stripping zone, and returning the withdrawn acid extract to the absorption zone.

12. A process for producing isopropanol by indirect hydration of propylene which comprises absorbing a fluid comprising propylene in a sulfuric acid extract containing 65-68 weight percent acid in an absorption zone, removing an acid extract containing 0.9 to 1.3 moles of propylene per mole of sulfuric acid from the absorption zone, passing said withdrawn extract without dilution with water to a flash stripping zone operated at a pressure below atmospheric pressure, removing a hydration product distillate from the stripping zone comprising 5–10% of the propylene in the acid extract in said stripping zone, adding sufficient water in the form of steam to the stripping zone to compensate only for that water consumed in forming the hydration product removed from the stripping zone, recovering isopropanol from the distillate, removing an acid extract of decreased saturation and still containing 65–68 weight percent acid from the stripping zone, and returning the withdrawn acid extract to the absorption zone.

13. A process according to claim 12 in which the pressure in the stripping zone is 200–600 mm. absolute.

14. A process according to claim 12 in which the absorption of propylene by the acid extract is carried out countercurrently.

15. A process according to claim 12 in which isopropyl ether is also recovered from the hydration product and at least a portion of the recovered ether is recycled to the absorption zone.

ERWIN H. AMICK, Jr.

REFERENCES CITED

The following references are of record in the file of this patent:

UNITED STATES PATENTS

| Number | Name | Date |
|---|---|---|
| 2,061,810 | Shiffler et al. | Nov. 24, 1936 |
| 2,414,759 | Mottern | Jan. 21, 1947 |
| 2,533,808 | Howlett et al. | Dec. 12, 1950 |